(12) United States Patent
Ouis

(10) Patent No.: US 11,181,507 B2
(45) Date of Patent: Nov. 23, 2021

(54) METHOD FOR AN ACOUSTIC RESONANCE INSPECTION AND DIAGNOSING OF DEFECTS IN SOLID MATERIALS AND A DIAGNOSTIC DEVICE

(71) Applicant: King Fahd University of Petroleum and Minerals, Dhahran (SA)

(72) Inventor: Djamel Ouis, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 171 days.

(21) Appl. No.: 16/401,212

(22) Filed: May 2, 2019

(65) Prior Publication Data

US 2020/0348266 A1 Nov. 5, 2020

(51) Int. Cl.
*G01N 29/04* (2006.01)
*G01N 29/46* (2006.01)
(Continued)

(52) U.S. Cl.
CPC .......... *G01N 29/045* (2013.01); *G01N 29/12* (2013.01); *G01N 29/348* (2013.01); *G01N 29/46* (2013.01); *G01N 29/14* (2013.01); *G01N 2291/0238* (2013.01); *G01N 2291/0289* (2013.01); *G01N 2291/02827* (2013.01);
(Continued)

(58) Field of Classification Search
CPC . G01N 2291/0238; G01N 2291/02827; G01N 2291/0258; G01N 2291/014; G01N 2291/0289; G01N 2291/2634; G01N 2291/2698; G01N 29/045; G01N 29/46; G01N 29/348; G01N 29/12; G01N 29/14; H04R 1/025; G10L 25/18
See application file for complete search history.

(56) References Cited

U.S. PATENT DOCUMENTS 3,345,861 A * 10/1967 Heath .................. G01N 29/045
73/584
3,531,983 A * 10/1970 Heath .................. G01N 29/045
73/584
(Continued)

FOREIGN PATENT DOCUMENTS

EP         0 379 622        8/1990
JP     2005-1890951 A       7/2005

OTHER PUBLICATIONS

Bucur, Urban Forest Acoustics, Chapter 3 (Year: 2006).*
(Continued)

*Primary Examiner* — David L Singer
(74) *Attorney, Agent, or Firm* — Oblon, McClelland, Maier & Neustadt, L.L.P.

(57) ABSTRACT

A method includes exciting a vibration of a solid material preferably in cylindrical shape, detecting the vibration by a pair of transducers attached at opposing positions on the solid material and preferably orthogonally aligned to the excitation force, adding the pair of sensor signals to mostly cancel bending mode signal components, and processing the added output signal to obtain a frequency spectrum. A method may also include identifying a resonance peak of an extensional mode diametrically symmetric, measuring a characteristic of the resonance peak, comparing the characteristic with a series of measured values for standard samples, and determining a defect status such as decay in a wooden pole solid material.

16 Claims, 9 Drawing Sheets

(51) Int. Cl.
  *G01N 29/12* (2006.01)
  *G01N 29/34* (2006.01)
  *G01N 29/14* (2006.01)
  *H04R 1/02* (2006.01)
  *G10L 25/18* (2013.01)

(52) U.S. Cl.
  CPC ............ *G01N 2291/2634* (2013.01); *G01N 2291/2698* (2013.01); *G10L 25/18* (2013.01); *H04R 1/025* (2013.01)

(56) References Cited

U.S. PATENT DOCUMENTS

| | | | | |
|---|---|---|---|---|
| 4,059,988 A * | 11/1977 | Shaw | ............... | G01N 29/045 73/579 |
| 4,399,701 A * | 8/1983 | Dunlop | ............... | G01N 29/12 73/579 |
| 4,646,754 A * | 3/1987 | Seale | ............... | A61B 3/16 600/402 |
| 4,702,111 A * | 10/1987 | Holland | ............... | G01N 29/045 73/579 |
| 4,926,691 A * | 5/1990 | Franklin | ............... | G01H 13/00 703/2 |
| 5,396,799 A * | 3/1995 | Ross | ............... | E02D 33/00 73/579 |
| 5,425,272 A * | 6/1995 | Rhodes | ............... | G01N 29/12 73/579 |
| 5,520,061 A * | 5/1996 | Thibault | ............... | G01H 1/003 73/579 |
| 5,621,172 A * | 4/1997 | Wilson | ............... | G01M 5/005 73/579 |
| 5,760,308 A * | 6/1998 | Beall | ............... | G01N 29/07 73/598 |
| 6,412,354 B1 * | 7/2002 | Birchak | ............... | G01N 9/002 73/861.356 |
| 6,779,404 B1 | 8/2004 | Brincker et al. | | |
| 6,813,927 B1 * | 11/2004 | Harris | ............... | G01N 33/46 73/12.12 |
| 6,813,948 B1 * | 11/2004 | Rinn | ............... | G01N 29/045 73/584 |
| 2005/0160819 A1 * | 7/2005 | Wang | ............... | G01N 29/2481 73/632 |
| 2008/0255806 A1 * | 10/2008 | Sambuelli | ............... | G01N 33/46 702/183 |
| 2014/0069192 A1 * | 3/2014 | Bartuli | ............... | G01N 29/12 73/579 |

OTHER PUBLICATIONS

Axmon et al, Experimental study on the possibility of detecting internal decay in standing Picea abies by blind impact response analysis, Forestry, vol. 77, No. 3, 2004 (Year: 2004).*

Axmon et al, Modal Analysis of Living Spruce Using a Combined Prony and DFT Multichannel Method for Detection of Internal Decay, Mechanical Systems and Signal Processing (2002) 16(4), 561-584 (Year: 2002).*

Axmon et al, Partial modal analysis for health assessment of living trees, Originally presented at the 10th Asia-Pacific Conference on Non-Destructive Testing held in Brisbane, Australia (Year: 2007).*

Ouis ; Vibrational and acoustical experiments on logs of spruce ; Wood Science and Technology 33 ; pp. 151-184 ; Jul. 16, 1997; 34 Pages.

Ouis ; Non Destructive Techniques for Detecting Decay in Standing Trees ; Arborcultural Journal vol. 27 ; pp. 159-177 ; 2003 ; 21 Pages.

* cited by examiner

METHOD FOR AN ACOUSTIC RESONANCE INSPECTION AND DIAGNOSING OF DEFECTS IN SOLID MATERIALS AND A DIAGNOSTIC DEVICE

BACKGROUND

Technical Field

The present disclosure is directed to materials diagnosis technology, and more particularly to nondestructive inspection of the mechanical strength of solid materials which have defects or decay.

Description of Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present disclosure.

The wood industry relies on the availability of high-quality logs cut from hewn trees. Inspection and control of cut logs, or more preferably of tree trunks prior to felling, is beneficial in order to make wood processing operations run efficiently. On the other hand, inspecting and diagnosing of wooden members used for supporting electrical conductors and telephone cables has long been required for maintaining reliable utility transmission and distribution systems. See for example, U.S. Pat. Pub. No. US2008/0255806 A1—incorporated herein by reference.

Nondestructive Inspection or Testing (NDI or NDT) includes inspecting, testing, or evaluating materials, components or assemblies for discontinuities, or differences in characteristics without destroying the serviceability of the part or system (see "Introduction to Nondestructive Testing", The American Society for Nondestructive Testing (ASNT), hypertext transfer protocol_asnt.org/MinorSite-Sections/AboutASNT/Intro-to-NDT.aspx—incorporated herein by reference). Among others, two test methods, Acoustic Emission Testing (AET) and Vibration Analysis (VA) are related to the present disclosure. The ASNT gives generally describes these two methods as presented below. AET is performed by applying a localized external force such as an abrupt mechanical load or rapid temperature changes or pressure change to the part being tested. The resulting stress waves in turn generate short-lived, high frequency elastic waves in the form of small material displacements, or plastic deformation, on the surface of the part that are detected by sensors attached to the surface of the part. VA refers to a process of monitoring the vibration signatures specific to a piece of rotating machinery and analyzing the information to determine the condition of that equipment. Three types of sensors are commonly used: displacement sensors, velocity sensors and accelerometers.

Several methods and techniques, often accompanied by equipment specially dedicated to assessing the strength of wood, have been developed. Some of these techniques use vibrations or sound, even ultrasound, to excite the wood element and monitor its response. The excitation may be in a transversal, radial and/or axial longitudinal direction (see for example U.S. Pat. No. 3,043,132 to Schubring; U.S. Pat. No. 3,066,525 to Harris; U.S. Pat. No. 3,345,861 to Heath; U.S. Pat. No. 3,531,983 to Heath; U.S. Pat. No. 3,664,180 to McDonald; U.S. Pat. No. 3,877,294 to Shaw; U.S. Pat. No. 4,059,988 to Shaw; U.S. Pat. No. 4,297,872 to Ikeda; and U.S. Pat. No. 4,399,701 to Dunlop, U.S. Pat. No. 6,779,404 to Brincker.

A method utilizing lateral vibrations for analyzing and/or diagnosing vertically standing telephone or power line poles has been reported. A single transducer, such as an accelerometer, is rigidly mounted on a pole about six feet up from the base. The natural modes of lateral vibrations are excited by striking the pole with a hammer at an opposite side of the accelerometer. The vibrations are detected and analyzed by a computer. Resonant frequencies or eigenfrequencies and spring constant of the pole are determined using a mathematical model of the pole and an iterative approximation in order to assess whether rot is present within the pole (see European Pat. App. Pub. No. 0379622—the entire content of which is incorporated herein by reference).

A pole monitoring kit for examining and diagnosing wooden poles by vibrational responses has been proposed. The kit includes a collar having spaced accelerometers is placed around the trunk, a hammer is used to produce vibrations in the pole. The sensors wirelessly transmit data to a portable computer for analysis that includes interpretation of the flexural-vibrational behavior, in terms of resonance and damping of the vibrations overall, producing information relating to the condition and soundness, of the pole. From subsequent measurements of the eigenfrequencies and/or resonance frequencies, the variations of said characteristics of the pole along the pole's vertical axis can be determined including the damage produced by degradation due to wood-eating insects and fungi. Above a certain threshold level, the pole may be marked as defective or in need of repair/replacement (see U.S. Pat. Pub. No. 20080255806A1—the entire content of which is incorporated herein by reference.

The use of an electrical voltage applied between two nearby positions on a wood element and for measurement of the electrical resistance between them has been disclosed (see W. C. Shortie et al., "Patterns of Resistance to a Pulsed Electric Current in Sound and Decayed Utility Poles" *Forest Products Journal*, vol. 28(1) pp 48-51, 1978, J. D. Thornton, "Detection of Decay in Wood Using a Pulsed-Current Resistance Meter (Shigometer)," *Forest Science* 27(1) pp 59-61).

Other more elaborate techniques using penetrating X or gamma rays and tomography of the interior of the investigated wood element have also been disclosed but require the use of expensive equipment and highly trained operators (see W. D. Gardner et al., "Detection of Defects in Standing Poles by X-Ray Techniques" *Proceedings of the* 11*th annual meeting of International Research Group on Wood Preservation*, Raleigh, N.C., USA, 5-9 May 1980).

Accordingly, it is one object of the present disclosure to prove a quick and efficient method for analyzing wooden structural members and poles for reliability that does not require exotic analytical techniques, dangerous electromagnetic energy or particle rays and can be used nondestructively on installed objects and structures. Vibrational and resistance measurements may be used as a basis for determining the stiffness and defect status of the structural member, preferably a wooden member.

SUMMARY

In an exemplary implementation, a method includes initiating a vibration of a solid material with a shape in a rotation symmetry for an angle of rotation around a longitudinal axis of the solid material, preferably in a cylindrical shape, by an excitation force given in a radial direction, detecting the vibration by a pair of transducers as a pair of sensor signals, adding the pair of sensor signals to generate a summed output to constitute an electrical output signal, and processing the electrical output signal to obtain a frequency spectrum. The pair of transducers are attached to a surface of the solid material, and aligned at opposing positions diametrically symmetric, and at an angle between a line connecting the pair of transducers and a direction of the excitation force being orthogonal.

In another exemplary implementation, a method further includes identifying a resonance peak of a diametrically symmetric extensional mode of the vibration from the frequency spectrum, measuring a characteristic of the resonance peak, comparing the characteristic with a series of measured values collected for standard samples of the solid material of interest with known stiffness or defect status, and determining at least one of a stiffness or a defect status of the solid material.

In another exemplary embodiment, a device includes a vibration exciting tool configured to provide an excitation force to the solid material, a pair of transducers configured to be attached to the surface of the solid material and aligned at opposing two positions diametrically symmetric and at an angle between a line connecting the pair of transducers and a direction of the excitation force being orthogonal and further configured to detect the vibration and output a pair of sensor signals, an adder configured to add the pair of sensor signals to output a summed output of the pair of sensor signals to constitute an electrical output signal, and an analyzing unit configured to obtain a frequency spectrum by processing the electrical output signal.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
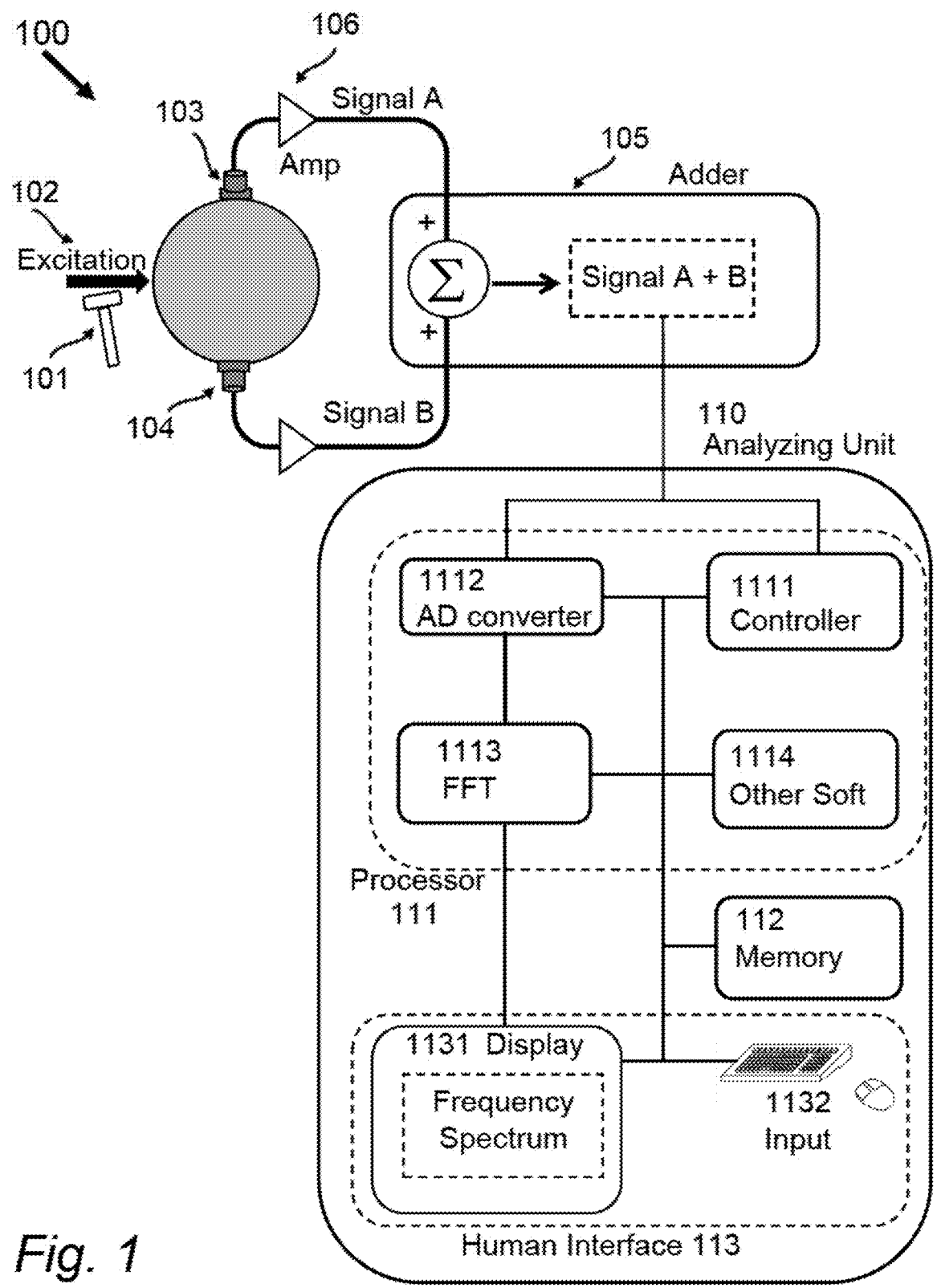
FIG. 1 is a schematic configuration and a block diagram of a device for characterizing solid materials by vibrations, according to certain embodiments of the present disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device and method for nondestructive inspection of the mechanical strength of solid materials which may be compromised by defects and/or decay. The solid materials may be logs and poles of various wooden species including tree stems and trunks, and/or other materials such as metallic poles, concrete pillars and the like.

A recent trend towards using more wood, a sustainable resource, for building dwellings and structures for human habitation derives from factors including: 1) the perception of wood materials as a renewable and sustainable natural resource, 2) fewer and less severe effects on human health and environment in comparison to some synthetic materials such as plastics, and 3) the availability of improved techniques for characterizing and improving the mechanical properties of wood and also in preventing and controlling fire hazards in wooden dwellings and buildings (see for example, M. H. Ramagea et al., "The wood from the trees: The use of timber in construction," *Renewable and Sustainable Energy Reviews*, 68 (2017) 333-359, the entire contents of which are incorporated herein by reference).

Like any other materials, wood is prone to have defects which are generally classified under two categories. The first category includes all malformations in the tree trunk like knots, splits and cross grain resulting from the natural adaptive development of the tree. The second category includes defects such as rot or decay, caused by external agents, such as foreign objects, microbes, insects and animals, which degrade principally the strength and appearance of the material.

FIG. 1 is a schematic configuration and a block diagram for a method and a device 100 for characterizing the mechanical strength and defect status (e.g., the presence or defects and/or decay) of solid materials by vibrations, according to certain embodiments of the present disclosure. The solid material is in a shape with a rotation symmetry for a certain angle of rotation around a longitudinal axis of the solid material, may be a cone, a truncated conical shape, a polygonal column, preferably in cylindrical shape.

A vibration exciting tool 101 is configured to inject a vibrational energy and initiate vibrations of the solid material by providing an excitation force 102. The excitation force 102 is provided substantially in a radial direction, namely in a direction substantially intersecting with the longitudinal axis with a substantially orthogonal angle. The vibration exciting tool 101 may be a hammer or a shaker driven electrically. The excitation force 102 may be in the form of an impulse or sinusoidal wave as described later herein. A pair of transducers 103 and 104 (optionally three or more transducers and preferably an integer number of matched pairs of transducers), for example piezoelectric accelerometers of type B&K 4371, are firmly attached to a specimen preferably in direct contact with the specimen preferably at diametrically symmetric opposed positions, namely, two positions symmetric for a 180-degree rotation around the longitudinal axis of the solid material, detect the vibrations at their positions, and output a pair of sensor signals in charge. Each of the pair of sensor signals from the pair of transducers is then fed to a charge amplifier 106 for amplifying and converting the electric charge into the form of voltage, generating voltage signals A and B which are fed to an adder 105. The adder 105 is configured to generates a summed output of the pair of transducers, signal (A+B) in this example to constitute an electrical output signal. The electrical output signal is then fed to an analyzing unit 110. With the above described diametrically symmetric configuration of the pair of transducers, a diametrically symmetric extensional mode of the vibration is selectively detected. The pair of sensor signals may be in the form of electrical charge conventionally, but may be in the form of voltage.

The analyzing unit 110 is configured to receive at least the electrical output signal and obtain a frequency spectrum by processing the electrical output signal. The analyzing unit 110 comprises a processor 111, a memory 112, and a human interface 113 which is further comprising an input tool 1132 and a display 1131. The processor 111 is comprising a controller 1111 configured to control operations of the analyzing unit 110 based on instructions given or pre-loaded through interface 113 and stores relevant information to a database in the memory 112. The analyzing unit 110 may either be a consolidated equipment (e.g., a computer or processor directly integrated with the analyzing unit and/or the adder), or a personal computer including several function blocks with software or be configured with several discrete devices and communication lines as illustrated in FIG. 1. As a first step in the analyzing process in the analyzing unit (110), an analog to digital converter (ADC) 1112 converts the electrical output signal (A+B) to a digital output signal, sends the digital output signal to a Fast Fourier Transformer (FFT) 1113 and a memory 112 for storing data for future steps. The electrical output signal (A+B) may also be stored by a recorder in the form of an analog signal then later may be regenerated for processing in the ADC 1112. The FFT 1113 then transforms the digital output signal to a representation in the frequency domain and outputs as a frequency spectrum in a display 1131. Resonant frequencies are then read on the frequency spectrum. The controller 1111 may be programmed with conventional software 1114 to determine the stiffness condition of the test specimen 101 depending on the material and dimension of the test specimen 101, utilizing the database compiled in the memory 112.

The specimen may be a wooden log, a wooden pole, a standing tree trunk or other similar materials with cylindrical, truncated conical shape, or a polygonal column. For a wooden pole in service or a standing tree trunk, the excitation force 102 is preferably located three to four feet from the ground-line, e.g., the level at which the specimen is no longer directly in contact with a support structure such as an in ground foundation, brace or ballast. The pair of transducers 103 and 104 with practically equivalent characteristics, are firmly attached by glue, screws or bolts on the surface of the test specimen 101, preferably at diametrically symmetrical opposed positions, and preferably on a same plane normal to an axis of the test specimen 101. Also the pair of transducers 103 and 104 are preferably aligned so that a line connecting them is orthogonal to a direction of the excitation force 102. The pair of transducers 103 and 104 is preferably placed a few inches above or below the position of the excitation force 102, in order to avoid local deformations caused by the excitation force 102.

Figure 2A:
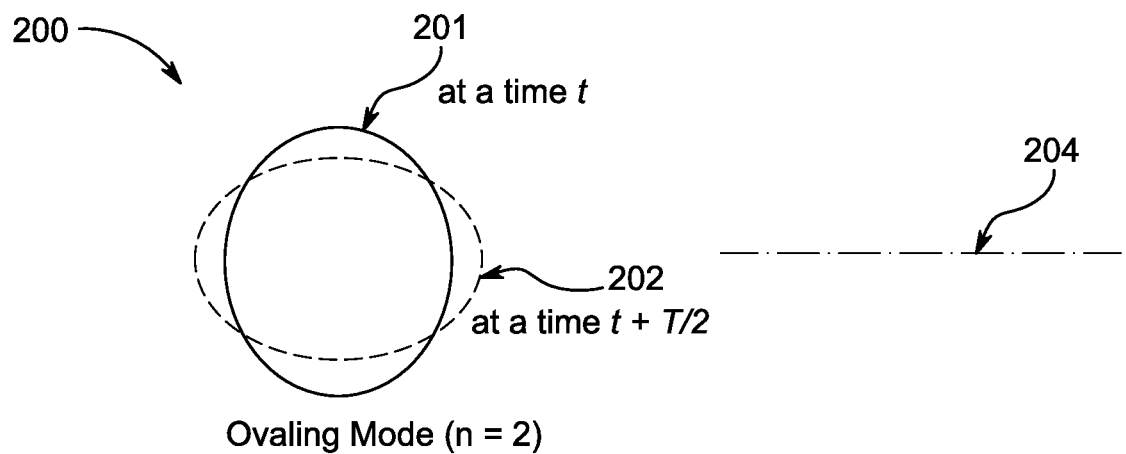
FIG. 2A is an exemplary illustration of the ovaling mode set into vibration through a radial excitation in a cylindrical wood element.
Figure 2B:
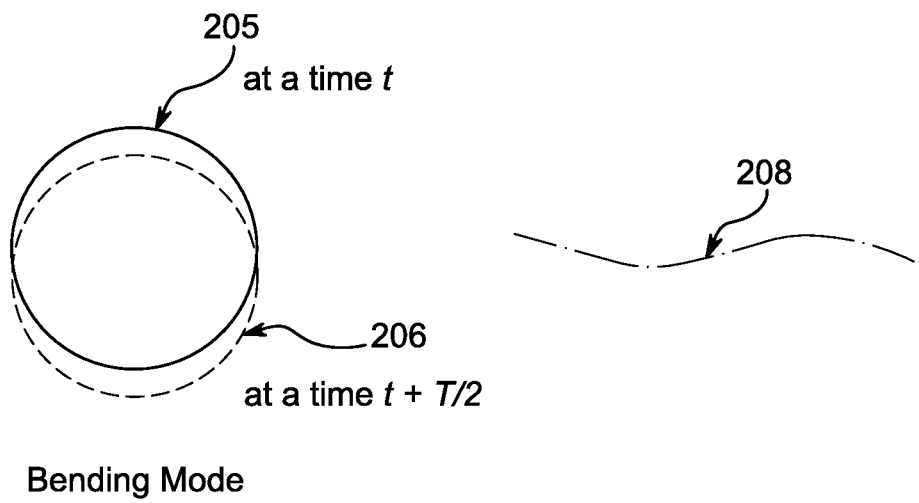
FIG. 2B is an exemplary illustration of the bending mode set into vibration through a radial excitation in a cylindrical wood element.

FIG. 2 is an exemplary illustration of some modes of the vibrations in a cylindrical solid material. (A) illustrates an extensional mode which is diametrically symmetric, so called "ovaling mode" with n=2, ($2\pi R=2\lambda$, where R and $\lambda$ each denotes radius of the cylinder and the wavelength, respectively); (B) illustrates the bending mode. The two circumference patterns 201 and 202 in (A) and 205 and 206 in (B) each correspond to typical two instances, at a time t and at a time t+T/2, where T is a period of the vibration. In the ovaling mode (A) with n=2, two diametrically symmetric circumference positions of the cross section vibrate in phase and with same amplitude, as illustrated. On the other hand, in the bending mode (B) with n=1, the two diametrically symmetric circumference positions vibrate out of phase with the same amplitude. Note however, it is not necessary that the cross section of the specimen represent a perfect circle—irregular cross sections that are oblong or oval or otherwise not uniform may also exhibit similar difference. Additionally, in the ovaling mode (A), the cylindrical axis 204 stays still and the phase does not change along the symmetrical axis. In the bending mode (B), the axis 208 bends along the axis and the phase also changes along the axis (see D. Ouis, "Vibrational and acoustical experiments on logs of spruce," *Wood Science and Technology* 33 (1999) 151-184, the entire content of which is incorporated herein by reference, S. Skatter, "TV Holography as a possible tool for measuring transverse vibration of logs: a pilot study," *Wood and Fiber Science*, July 1996, V. 28(3) 278-285, the entire contents of which are incorporated herein by reference).

The phase differences, namely vibrations in phase at two diametrically symmetrical positions in the ovaling mode and out of phase vibrations in the bending mode at two diametrically symmetrical positions are utilized to selectively detect the ovaling mode by aligning the transducers at diametrically symmetric positions as in FIG. 1. By summing the pair of sensor signals, signal components for the diametrically symmetric ovaling mode are doubly enhanced because they are in phase, while signal components for the bending mode are mostly cancelled out because they are out of phase. Thus a selective detection of the diametrically symmetric ovaling mode is realized with the pair of transducers aligned according to the certain embodiment of the present disclosure described above.

When the vibrations of the solid material are caused by the impulse force, a pair of transient sensor signals detected by the pair of sensors attached to the solid material can be regarded as an impulse response of a system including the solid material and the pair of sensors attached to the solid material. In general, a frequency response of a system is characterized by a characteristic transfer function $H(\omega)$. When input $f(t)$ is applied to the system as a function of time t, the system responds with output g(t), satisfying below relation.

$$G(\omega)=H(\omega)F(\omega), \quad (1)$$

where $F(\omega)$ and $G(\omega)$ are Fourier Transformations (FT) of input $f(t)$, and output $g(t)$, respectively. Thus, a response or output $g(t)$ of the system against the input $f(t)$ is given by the Inverse Fourier Transformation (IFT) of $G(\omega)$, $$g(t) = \frac{1}{2\pi} \int_{\infty}^{\infty} H(\omega) F(\omega) \exp(j\omega t) d\omega. \quad (2)$$

Now, assuming the input function $f(t)$ is a unit impulse represented by the delta function $\delta(\omega)$, and the output against the delta function input is given by $h(t)$, then, the FT of the input is given by $$F(\omega) = \int_{\infty}^{\infty} \delta(t) \exp(-j\omega t) dt = 1. \quad (3)$$

Therefore, $$G(\omega) = H(\omega) F(\omega) = H(\omega) = \int_{\infty}^{\infty} h(t) \exp(-j\omega t) dt. \quad (4)$$

Eq. (4) means $G(\omega)$, namely the FT of the output function $h(t)$ gives the characteristic transfer function $H(\omega)$ of the system when the input $f(t)$ is the delta function or a short impulse which can approximate the delta function.

On the other hand, when the input function $f(t)$ is too broad to approximate the delta function, the response $g(t)$ is given by below convolution taking time delay $\tau$ of responses into account, $$g(t) = \int_{\infty}^{\infty} h(\tau) f(t-\tau) d\tau. \quad (5)$$

Here, $h(t)$ is the impulse response output when the input is the delta function $\delta(t)$. Taking FT of above Eq. (5), $$\begin{aligned} G(\omega) &= \int_{\infty}^{\infty} g(t) \exp(-j\omega t) dt \\ &= \int_{\infty}^{\infty} \left[ \int_{\infty}^{\infty} h(\tau) f(t-\tau) d\tau \right] \exp(-j\omega t) dt \\ &= \int_{\infty}^{\infty} h(\tau) \exp(-j\omega \tau) d\tau \int_{\infty}^{\infty} f(t-\tau) \exp[-j\omega(t-\tau)] d(t-\tau) \\ &= H(\omega) F(\omega). \end{aligned} \quad (6)$$

Therefore, $$H(\omega) = \frac{G(\omega)}{F(\omega)} \quad (7)$$

where, $$H(\omega) = \int_{\infty}^{\infty} h(\tau) \exp(-j\omega \tau) d\tau, \quad (8)$$

$$F(\omega) = \int_{\infty}^{\infty} f(t) \exp(-j\omega t). \quad (9)$$

Here $H(\omega)$ is the characteristic transfer function of the system, and corresponds to a FT of the impulse response $h(t)$, the output against an input of the delta function. $F(\omega)$ is a FT of the input function $f(t)$, $G(\omega)$ is a FT of the output function $g(t)$.

The above relations mean that the characteristic transfer function $H(\omega)$ can be obtained from Eq. (7), by obtaining $F(\omega)$, the FT of the input function $f(t)$ and $G(\omega)$, the FT of the output function $g(t)$ as a response to the input function $f(t)$, even when the input was not the delta function or did not approximate it. Recently, a Fast Fourier Transformation (FFT) is conventionally available utilizing a computer equipped with advanced semiconductor devices such as field programmable gate arrays (FPGA).

The characteristic transfer function $H(\omega)$ of the system contains information including resonance frequency characteristics of the system, one of the main concerns of the present disclosure. The algorithm used in the present disclosure that functions to read resonance peaks from the FT of the impulse response is also based on above relations.

As an alternative method, the characteristic transfer function $H(\omega)$ can be measured by tracing a frequency response of the system while applying a sinusoidal signal input with a constant power $$f(t) = A_0 \exp(j\omega_0 t) \quad (10)$$

and gradually sweeping the frequency of the sinusoidal signal in a frequency band of interest, 10 Hz to 15 KHz, for example. There, Eq. (9) gives the FT of the input $f(t)$ as $F(\omega) = 2\pi A_0 \delta(\omega - \omega_0)$, then Eq. (2) gives the output as $$g(t) = A_0 H(\omega_0) \exp(j\phi(\omega_0 t)). \quad (11)$$

When, a phase shift $\phi(\omega_0)$ of the output signal is taken into account, Eq. (11) can be expressed as $$g(t) = A_0 H(\omega_0) \exp[j\phi(\omega_0)] \exp(j\omega_0 t). \quad (12)$$

Thus, using Eqs. (10) and (12), an amplitude ratio or a square root of power ratio of $g(t)$ to $f(t)$ directly gives $H(\omega_0)$, sweeping the frequency $\omega_0$ gives the characteristic transfer function $H(\omega)$, namely a frequency spectrum of an amplitude of the characteristic transfer function for a frequency band of interest. The amplitudes of the signals can be measured by using a phase sensitive detector or a lock-in amplifier. The phase shift $\phi(\omega_0)$ can also be measured by using the lock-in amplifier, in addition to the amplitude ratio. Thus, in this alternative approach, a frequency spectrum of the phase shift component of the characteristic transfer function can also be measured. Recent digital technology empowered by advanced semiconductor devices such as field programmable gate arrays (FPGA) enable extension of the lock-in amplifier to add various analysis functions including the ADC and the FFT. (See, "Principles of lock-in detection and the state of the art," Zurich Instruments, White Paper, 2016, hypertext transfer protocol_www.zhinst.com/products/lock-in-amplifiers_—incorporated herein by reference.) A combination of the electrodynamic shaker and the sinusoidal signal sweeper as the driver can be used in those alternative methods in providing the excitation force(s).

As a further alternative method, a broad band noise generator is used to generate approximately equal noises at all frequencies under concern. Eq. (3) indicates a flat noise input is equivalent to the delta function input. Therefore, a resulting output response $g(t)$ gives an equivalent to the function $h(t)$ which is an output function when input was the delta function. Then the FT of $g(t)$ gives the characteristic transfer function $H(\omega)$, as given by Eq. (4).

It should be noted that the embodiments in the present disclosure are directed to selective detection of resonance phenomena with a specific vibration mode with diametrically symmetric mode patterns. Consequently, the characteristic transfer function or the frequency spectrum measured are inevitably under influence and restriction of such selective detection system, and thus focuses on or emphasizes the frequency response characteristics of the system from the view point of the specific vibration mode with diametrically symmetric mode patterns.

Figure 3:
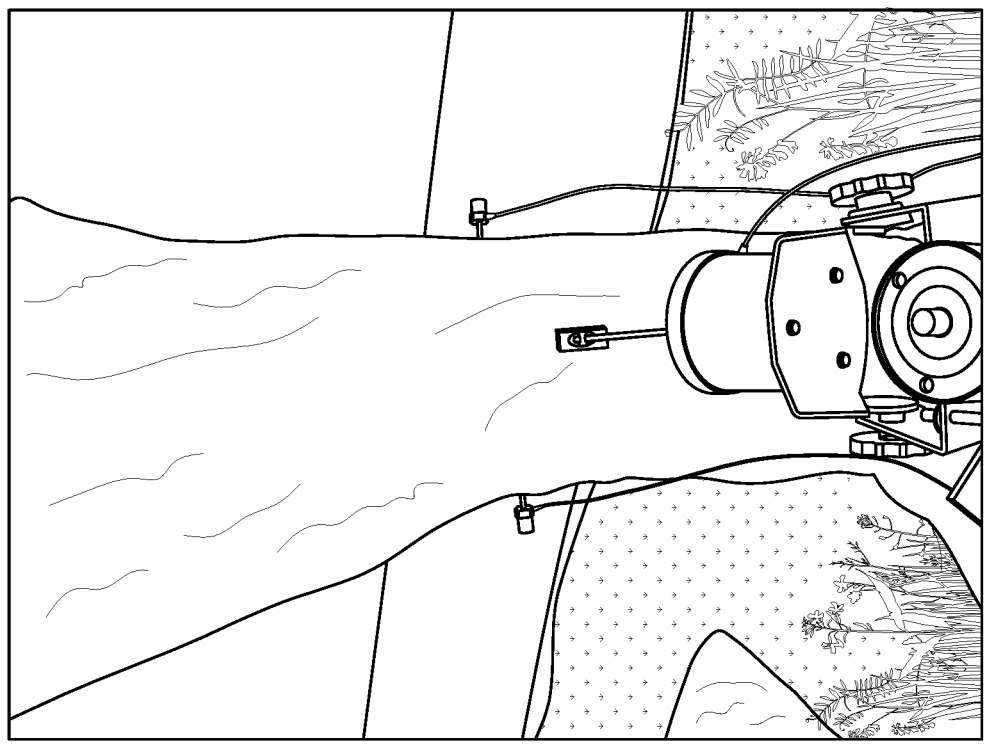
FIG. 3 is a set of photographs for an exemplary configuration of the method and the device applied to a tree trunk according to certain embodiments.
Figure 3:
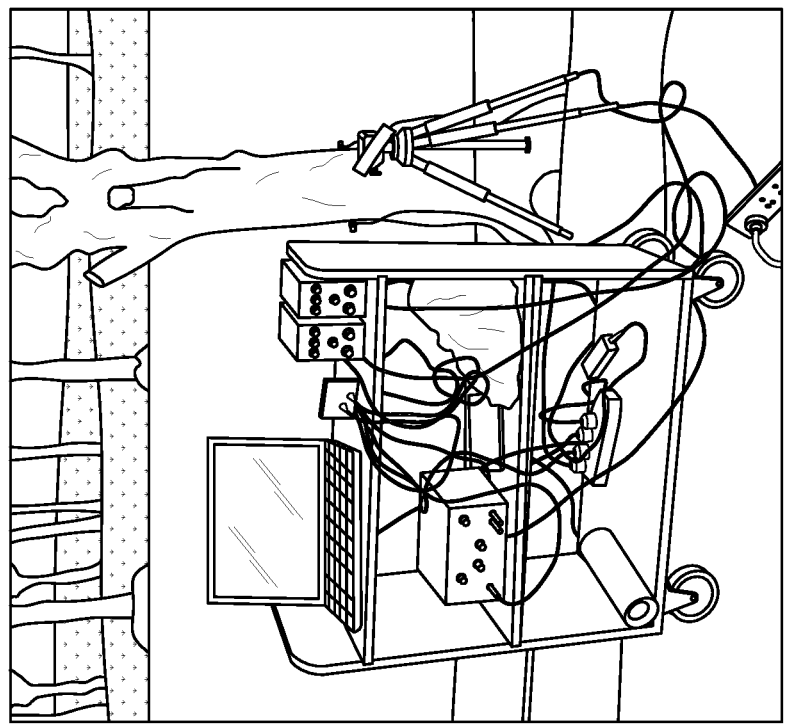

FIG. 3 is a set of photographs for an exemplary configuration of the device according to certain embodiments of the present disclosure. Here two uni-axial piezo-electric accelerators of type B&K 4371 with practically equivalent characteristics were attached to a dicotyledon tree trunk at diametrically opposed positions. An electrodynamic shaker of type B&K 9001 was used as a source of the excitation force and was attached at exactly (e.g., ±0.01% of the distance between positions of the pair of transducers, preferably ±0.1%±0.5%, ±1% or ±5%) mid-way distance between positions of the pair of transducers. A few inches long shaft rod was firmly screwed at one of its ends to the vibrating base of the electrodynamic shaker, and the other end was attached to a metal stud screwed to the tree trunk. The shaft rod was oriented in radial direction of the test specimen. The piezo-electric accelerators and the electrodynamic sensors were attached at a height of 0.63 m from the ground, where the circumference of the trunk was measured as 0.70 m.

Figure 4:
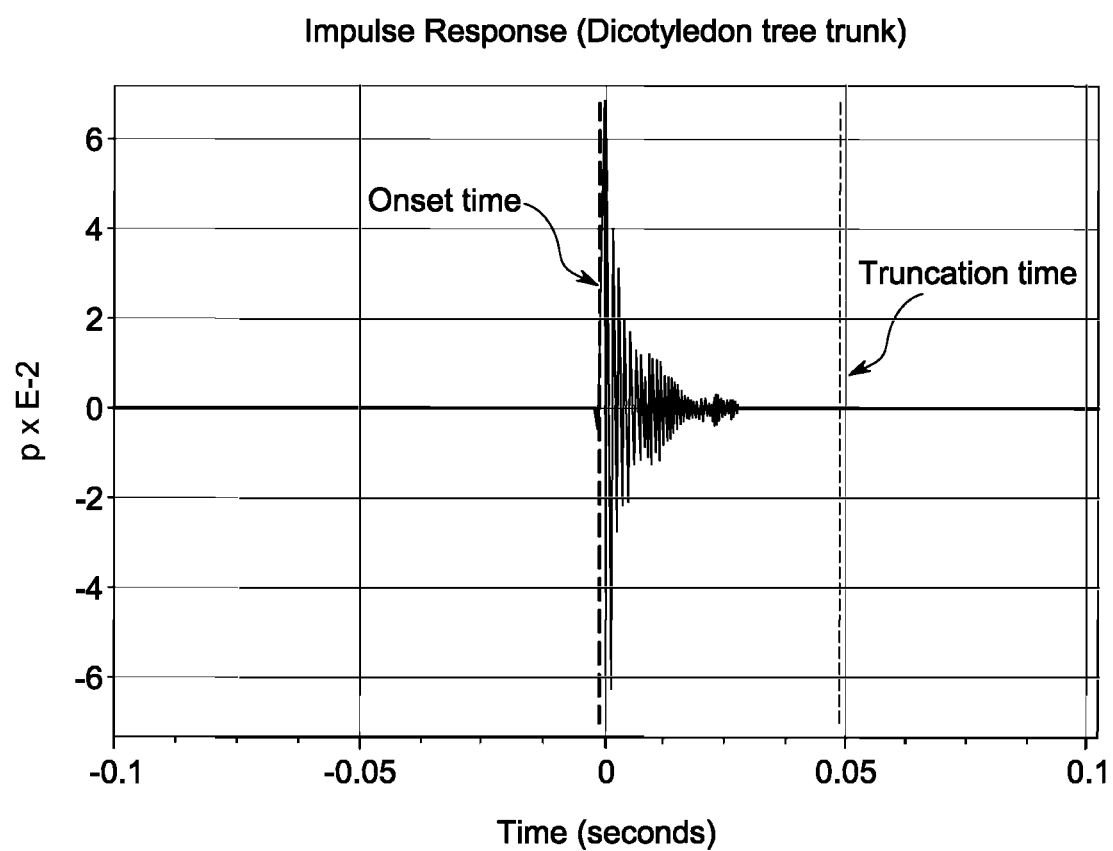
FIG. 4 is an example diagram of the impulse response obtained for the trunk of the dicotyledon tree using the device configuration according to certain embodiments exemplified in FIG. 3.
Figure 5:
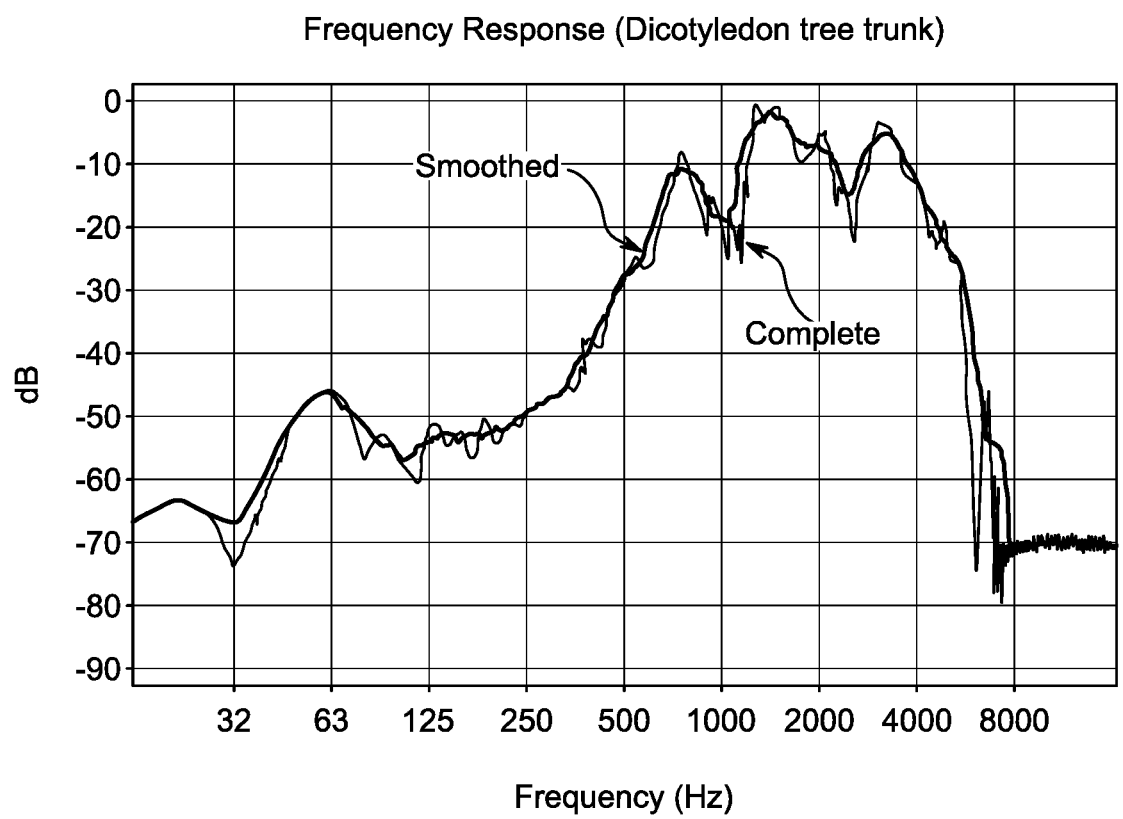
FIG. 5 is an exemplary graph of frequency spectrum obtained by Fast Fourier Transformation of the impulse response of the trunk of the dicotyledon tree exemplified in FIG. 6.

FIG. 4 is an exemplary graph of the impulse response obtained for the trunk of the dicotyledon tree using the device configuration according to certain embodiments exemplified in FIG. 5. The onset time and the truncation time illustrated in FIG. 4 are a time when the response signal emerges and a time when the measuring the response signal is terminated, respectively. The truncation time dT of 0.05 (s) limits frequency accuracy in frequency spectrum by a relation $\Delta f \geq 1/$ dT, which gives the frequency accuracy $\Delta f \geq 20$ Hz.

FIG. 5 is an exemplary graph of the frequency spectrum obtained by Fast Fourier Transformation (FTT) of the impulse response of the trunk of the dicotyledon tree exemplified in FIG. 4. FIG. 5 include two curves, complete and smoothed as indicated. Several peaks are noticed at 754, 1437, 2003 and 3100 Hz, with the most pronounced peak at the second resonance frequency. These frequencies are in the approximate ratio of 1:2:3:4, indicating the mode at the frequency of 754 Hz is a fundamental mode and the other are harmonics. The resonance peaks can be attributed to the ovaling modes, the fundamental mode (n=2) and harmonics with n=4, 6 and 8 with diametrically symmetrical mode patterns as discussed below in detail.

A frequency of the fundamental bending mode for n=1 is reported to be much lower. For example, for the standing tree, the resonance frequency estimated is in the order of 10 Hz for a tree that is 10 m high and has a diameter of 30 cm at ground level (see D. Ouis, "Detection of rot in standing trees by means of an acoustic technique," *Arboricultural Journal* 2001, Vol. 25, pp. 117-152, at 143—incorporated herein by reference in its entirety). Even for a wooden log having a length of 1.3 m and a diameter of 10 cm, the resonance frequency for the fundamental bending mode is reported to be 100 to 300 Hz (see D. Ouis, at p. 135).

The resonance frequency of the fundamental mode of the ovaling mode for n=2 is estimated to be close to the peaks shown in FIG. 5. The speed of sound across a tree trunk has been reported to be 289 m/s (decayed) to 546 m/s (sound). The resonance frequency of the ovaling mode of n=2 for a tree trunk with the circumference length 0.7 m (wavelength 0.35 m) is in a range of 826 Hz to 1560 Hz, assuming the frequency is given by dividing the sound speed by wavelength. This range covers the fundamental mode observed.

The ratio of resonance frequencies that is approximated to be 1:2:3:4 is well explained by the higher order modes of the ovaling mode. Assuming only diametrically symmetrical modes have been detected, those for the ovaling modes are with the node numbers n=2, 4, 6, and 8, giving the frequency ratio of 1:2:3:4, same as observed in FIG. 5. The ovaling nomination is given only for the case n=2, because this mode changes the circular circumference to an ellipse (or egg) shape. For n=4 the shape approaches that of a cross (or octagon). On the other hand, the bending modes exhibit more complex ratio for the higher order modes, either under cantilever model or free-free holding model and thus the ratio cannot be explained in simple integer numbers. The circumferential wavelength of the ovaling mode coincides with the bending wave-length only in the case of a hollow thin cylinder with circular cross-section. For a filled rod the relation-ship is more complicated.

A further notable result evident in FIG. 5 is that the asymmetrical modes have been confirmed to have been well suppressed in the measurement results. Based on the interpretation that the observed resonances correspond to the ovaling modes with n=2, 4, 6 and 8, there other asymmetrical modes with n=3, 5 and 7 that must have been excited in the tree trunk. However, the observed spectrum exhibits a large suppression of the spectrum at frequencies corresponding to those modes, namely at 1130 Hz for n=3, and 1885 Hz for n=5, 2640 Hz for n=7, as observed in the FIG. 5. These also demonstrate the differential detection or selectivity of diametrically symmetrical modes which is attributed to the diametrically symmetrical configuration of the pair of detecting transducers and also the diametrically symmetrical configuration of the excitation forces under certain embodiments of the present disclosure.

Figure 6:
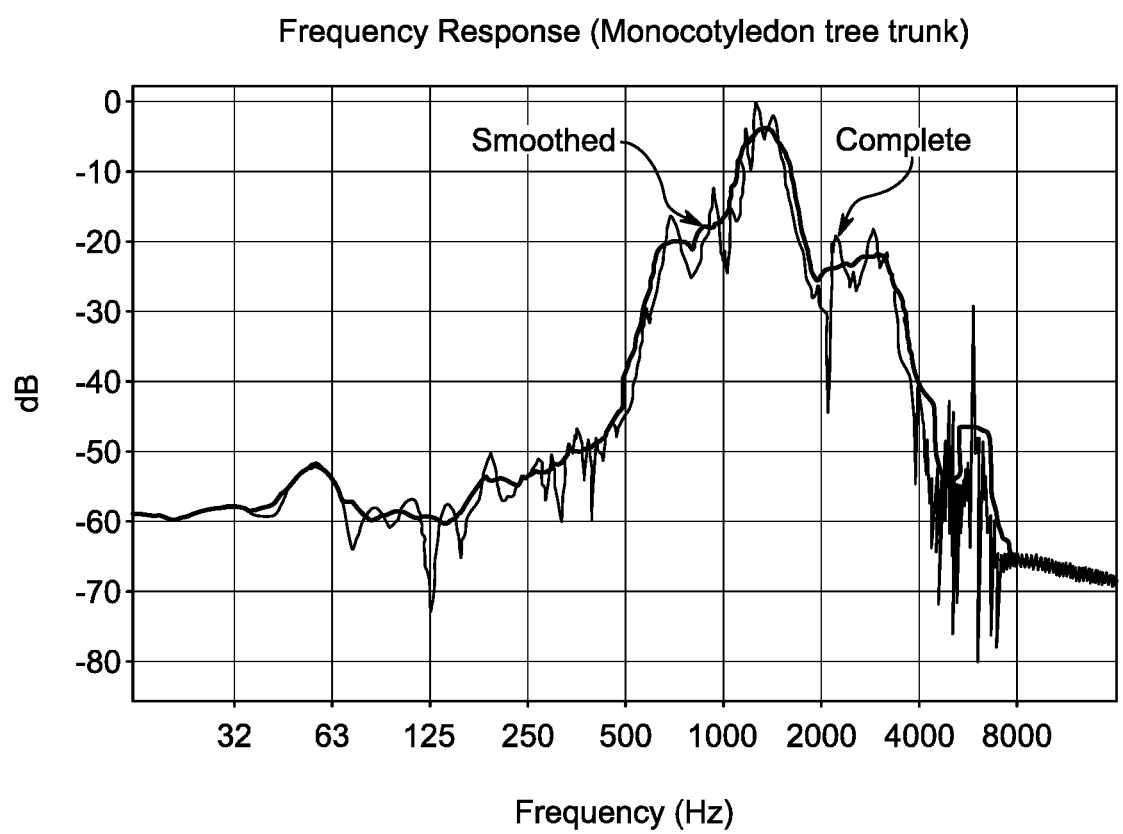
FIG. 6 is another exemplary graph of frequency spectrum obtained by Fast Fourier Transformation of the impulse response for the trunk of a monocotyledon tree according to certain embodiments.

FIG. 6 is an exemplary graph of the frequency spectrum obtained by Fast Fourier Transform of the impulse response signals for the trunk of a palm tree (monocotyledon tree) according to certain embodiments. The pair of transducers and the shaker were attached at a height of 1.45 m above the ground, the circumference of the tree was measured as 0.93 m. Several peaks were noticed at around 700, 900, 1335, 2100 and 3000 Hz, with the most pronounced peak at the second resonance frequency. Except for the peak at 900 Hz, these frequencies are in an approximate ratio of 1:2:3:4, indicating the mode at the frequency of 700 Hz is a fundamental mode and the others are harmonics. The peaks with frequency ratios in simple integer numbers are attributed to the ovaling modes based on same arguments made in FIG. 5. Also similar to FIG. 5, suppressions of the modes that are not diametrically symmetric are confirmed between those peaks, namely at 1050 Hz for n=3, 1750 Hz for n=5, 2450 Hz for n=7. The mechanism causing the resonance peak at 900 Hz is uncertain, but may depend on unique layer structure of trunk of the palm tree without the tree ring.

Figure 7A:
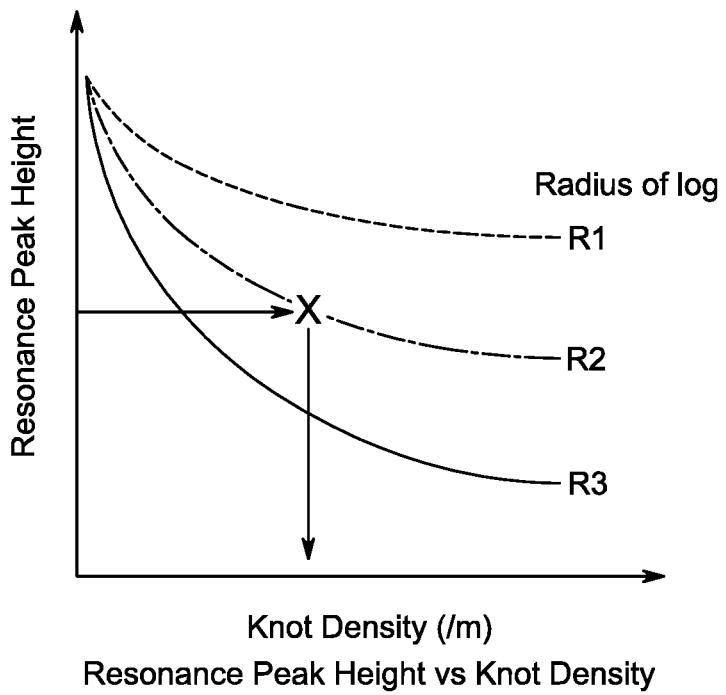
FIG. 7A is a schematic diagram to evaluate the knot density of wooden log or tree trunk using the device and the method under certain embodiments.

FIGS. 7A and B illustrate schematic diagrams to evaluate knot density or the decay rate of a wooden member (such as a log or tree trunk) using the measurement system and method in certain embodiments. Diagram type (A) illustrates a schematic diagram on the knot density dependence of resonance peak height of the ovaling mode, which is to be obtained by evaluating a group of standard test samples with known knot density sorted by radius and type of wood and so on. By preparing the diagram type (A), namely a series of measured values of the peak height, sorted by radius and type of wood for standard samples as one of database, practical applications to field sample become feasible. In field applications, a data set of the resonance peak height known from the frequency spectrum, the radius, and the wood type are collected, then the knot density is determined by plotting the data on the diagram. There is a relationship between circumference of solid cylinder, $2*\pi*a$, resonance frequency f and speed of wave propagation c: $2*\pi*a*f/c=1.46$ (for Poisson ratio $\nu=0.293$), so the resonance frequency is inversely proportional to the radius.

Diagram type (B) illustrates a schematic diagram of the decay rate dependence of resonance frequency and peak width of the ovaling mode, which is similarly obtained by evaluating a group of standard test samples with known decay rates, sorted by radius, wood type and so on. Similarly, by preparing this diagram as a comparative data base, practical applications to field sample become feasible. In practical applications, a data set on the resonance peak frequency and peak width are read from the frequency spectrum measured during a field test of a wood specimen, of known radius, wood type and other relevant data. The decay rate is then determined by plotting the data on the diagram, one from peak frequency and the other from peak width. In acoustics, decay rate is the rate of fall-off of sound level with time, i.e. dB/s. The amplitude of the resonance may in fact increase with more defects in the log, and the reverberation time may also increase (less damping in the rot-affected material), but only for the extensional modes. For longitudinal modes it may be the opposite effect depending on the degree of rot infection.

The ovaling modes are very sensitive to the two major types of defects in wood specimens; namely knots and decay. For example, knots cause a lowering of the resonance peak level of the ovaling mode by over 30 dB. Decay causes 1) shifting of the ovaling mode and 2) broadening of the peak width. The shifting due to decay may be caused by both changes in modulus of elasticity and density for the decayed portion, both decreases due to decay (see D. Ouis, *Wood Science and Technology* 33 (1999), at 170-176—incorporated herein by reference).

Figure 8:
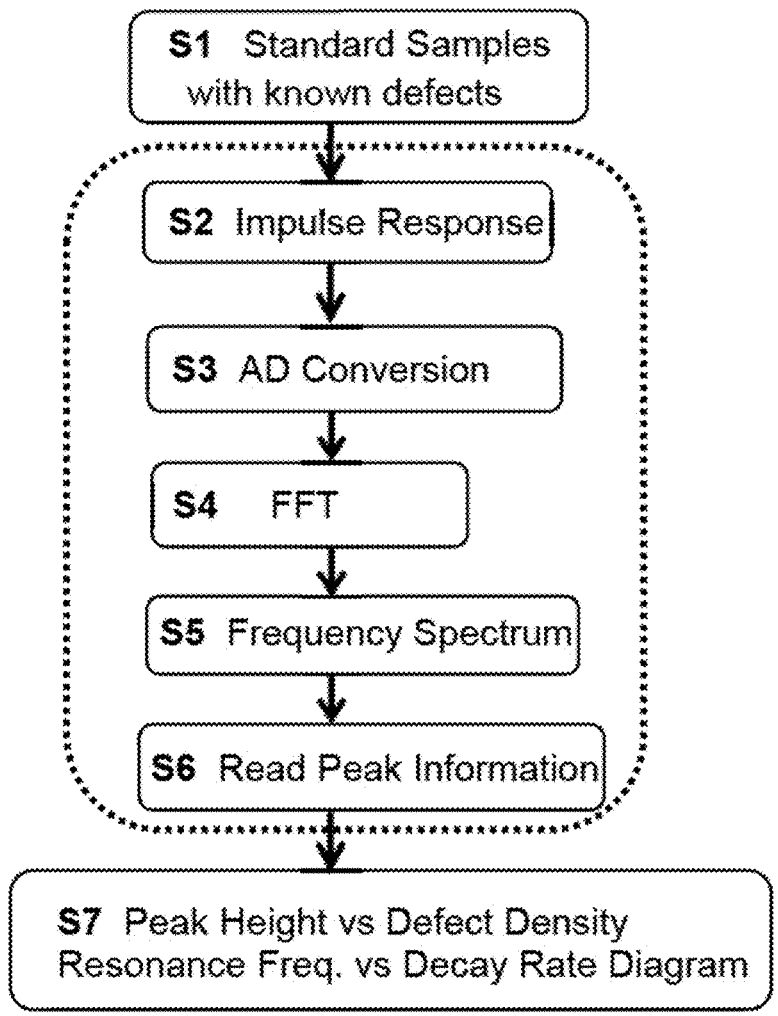
FIG. 8 illustrates an exemplified flow chart for the first stage of database preparation in implementing the method according to certain embodiments.
Figure 9:
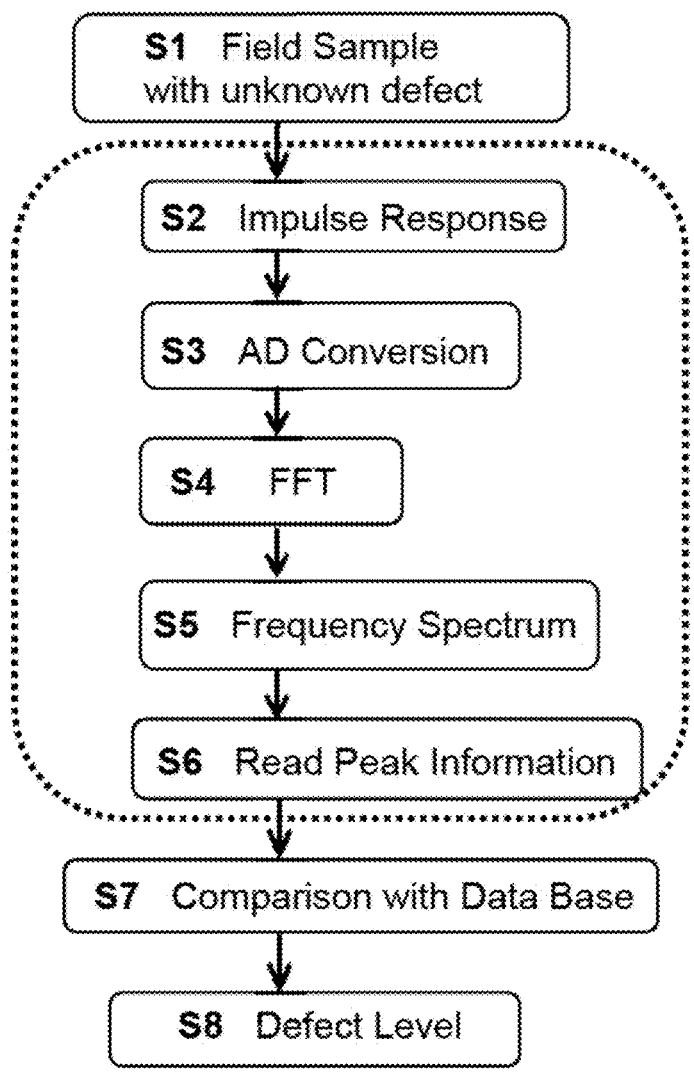
FIG. 9 illustrates an exemplified flow chart for the second stage of field application in implementing the method according to certain embodiments.

FIG. 8 illustrates flow charts of steps for performing the first stage of the diagnostics method according to certain embodiment. Steps S2 to S6 are core steps for obtaining a frequency spectrum to read resonance peaks of the ovaling modes for a solid material.

Figure 7B:
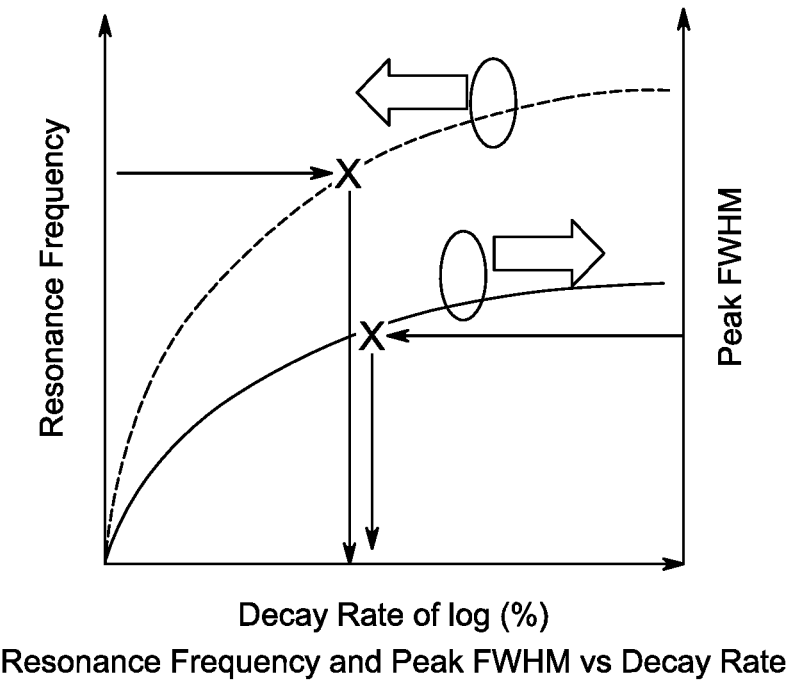
FIG. 7B is a schematic diagram to evaluate the decay rate of wooden log or tree trunk using the device and the method under certain embodiments.

In the first stage, a routine of measurements is repeated to establish a database for a specified solid material under interest using standard samples of the specified solid material with known stiffness or defect status. The database will include various diagrams as exemplified in FIG. 7 in wood log case.

FIG. 8 illustrates flow charts of steps for performing the second stage of the diagnostics method according to certain embodiment. The second stage is for a practical field application of the method to the specific solid material. Applying the method and comparing a measured resonance peak information on a field sample with diagrams in the database, the stiffness or the defect status sought is determined for the field sample.

The device and the method according to certain embodiments of the present disclosure can be applied to a solid body not only made of wood but also made of other materials, when inner defects affect mechanical strength and need to be controlled. For example, a concrete pile would be an example of such material where inner defects affect its mechanical strength.

In general, a computer that performs the processes described herein (e.g., one or more of the tasks of FIG. 1) can include one or more processors and a memory (e.g., a non-transitory computer readable medium). The process data and instructions may be stored in the memory. These processes and instructions may also be stored on a storage medium such as a hard drive (HDD) or portable storage medium or may be stored remotely. Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, algorithms and calculations described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for characterizing a solid material having rotational symmetry around a longitudinal axis, the method comprising:

initiating a vibration of the solid material by an excitation force;

detecting the vibration by a pair of transducers as a pair of sensor signals;

adding the pair of sensor signals to generate a summed output of the pair of transducers to constitute an electrical output signal; and processing the electrical output signal to obtain a frequency spectrum, wherein the excitation force is provided substantially in a radial direction substantially orthogonal to the longitudinal axis, wherein the pairs of transducers are:
attached to a surface of the solid material, and
aligned diametrically at symmetrically opposed positions at a 180-degree rotation around the longitudinal axis of the solid material, and at an angle between a line connecting the pair of transducers and the direction of the excitation force.

2. The method of claim 1, further comprising:
identifying a resonance peak of a diametrically symmetric extensional mode of the vibration from the frequency spectrum;
measuring a characteristic of the resonance peak, the characteristic comprises at least one of a resonance frequency, a peak intensity, a peak full width half maximum (FWHM) of the resonance peak, or a phase shift change at the resonance peak;
comparing the characteristic of the resonance peak with a series of corresponding measured values collected for standard samples of the solid material of interest with known stiffness or defect status; and
determining at least one of a stiffness or a defect status of the solid material.

3. The method of claim 2, further comprising:
storing at least one of the electrical output signal, or the characteristic of the resonance peak, with an identifying code of the solid material to a memory.

4. The method of claim 2, wherein the solid material is a cylindrical solid element,
wherein the obtaining of the frequency spectrum covers a diametrically symmetric ovaling mode with n=2 and harmonics with n=4 and 6;
wherein the series of corresponding measured values comprises at least one of a dependence of the resonance frequency on a defect status, a dependence of the peak intensity on the defect status, or a dependence of the FWHM on the defect status,
where each of the dependences is sorted by at least one of a radius, a type of material, or a process of the cylindrical solid element.

5. The method of claim 4, wherein the cylindrical solid element is a wooden log or a tree trunk that approximates a cylindrical element, and the defect status comprising at least one of a knot density or a decay rate of wood.

6. The method of claim 5, wherein the obtaining of the frequency spectrum is in the frequency range from 0 to 2000 Hz.

7. The method of claim 1, wherein the vibration is initiated by an impulse force given by a hammer or an electrodynamic shaker, and
wherein the processing the electrical output signal further comprises:
Fourier transforming the electrical output signal to obtain the frequency spectrum.

8. The method of claim 1, wherein the vibration is initiated by a sinusoidal force given by an electrodynamic shaker driven by a sinusoidal electrical driving signal, wherein a frequency of the sinusoidal electrical driving signal is swept from zero to a predetermined frequency,
wherein the processing of the electrical output signal further comprises obtaining at each of the frequency at least one of
a square root of a ratio of a power of the electrical output signal to a power of the sinusoidal electrical driving signal,
a ratio of an amplitude of the electrical output signal to an amplitude of the sinusoidal electrical driving signal, and/or
a phase shift of the electrical output signal from the sinusoidal electrical driving signal.

9. The method of claim 1, wherein the vibration is initiated by a sinusoidal force given by an electrodynamic shaker driven by a sinusoidal electrical driving signal, wherein a frequency of the sinusoidal electrical driving signal is swept from zero to a predetermined frequency, and
wherein the method further comprises:
monitoring the sinusoidal electrical driving signal,
wherein, the processing the electrical output signal further comprising:
Fourier transforming $F(\omega)$ of the sinusoidal electrical driving signal;
Fourier transforming $G(\omega)$ of the electrical output signal, and
estimating a ratio of $G(\omega)$ and $F(\omega)$, at each of the frequency.

10. The method of claim 1, wherein the vibration of the solid material is initiated by providing a pair of excitation forces to the solid material, wherein the pair of excitation forces are controlled to be in phase with each other and provided substantially in the radial direction at diametrically symmetric opposing positions.

11. The method of claim 1, wherein each of the pair of sensor signals from the pair of transducers is amplified and converted from a form of charge to a form of voltage before generating the summed output.

12. A device for characterizing a solid material by vibration, the solid material being in a rotation symmetry for an angle of rotation around a longitudinal axis of the solid material, the device comprising:
a vibration exciting tool configured to cause a vibration of the solid material by providing an excitation force to the solid material substantially in a radial direction, namely in a direction substantially intersecting with the longitudinal axis with a substantially orthogonal angle;
a pair of transducers configured to be attached to the surface of the solid material and to detect the vibration and output a pair of sensor signals;
an adder configured to add the pair of sensor signals and to output a summed output of the pair of transducers to constitute an electrical output signal;
an analyzing unit configured to receive the electrical output signal, process the electrical output signal and to output a frequency spectrum of a characteristic transfer function of the solid material, the analyzing unit further comprising a processor, a memory, and a human interface,
wherein the pair of transducers are configured to be aligned at opposing positions diametrically symmetric, namely, symmetric for a 180-degree rotation around the longitudinal axis of the solid material, and at an angle between a line connecting the pair of transducers and the direction of the excitation force being orthogonal.

13. The device of claim 12, wherein the vibration exciting tool comprises a hammer or an electrodynamic shaker, and wherein the vibration exciting tool is further configured to provide an impulse force as the excitation force, and
   wherein the analyzing unit is further configured to make a Fourier Transformation of the electrical output signal to output the frequency spectrum.

14. The device of claim 12, wherein the vibration exciting tool comprises an electrodynamic shaker, and the electrodynamic shaker is configured to provide a sinusoidal force as the excitation force by an electrical driving signal $f(t, \omega)$, with an angular frequency $\omega$ to be swept from zero to a predetermined angular frequency,
   wherein the analyzing unit is further configured to:
      obtain a Fourier Transformation $F(\omega)$ of the electrical driving signal $f(t, \omega)$, and a Fourier Transformation $G(\omega)$ of the electrical output signal $g(t, \omega)$, and
      estimate a ratio of $G(\omega)$ to $F(\omega)$ for each of the angular frequency $\omega$ swept in order to obtain the frequency spectrum.

15. The device of claim 12, wherein the vibration exciting tool comprises an electrodynamic shaker, the electrodynamic shaker is configured to provide a sinusoidal force as the excitation force by an electrical driving signal $f(t, \omega)$, with an angular frequency $\omega$ to be swept from zero to a predetermined angular frequency,
   wherein the analyzing unit is further comprising a lock-in amplifier, and configured to process at least either of:
      estimating an amplitude of a characteristic transfer function by taking a ratio of an amplitude of the electrical output signal $g(t, \omega)$ to an amplitude of the electrical driving signal $f(i, \omega)$, for each of the angular frequency $\omega$ swept, in order to obtain a frequency spectrum for the amplitude of the characteristic transfer function, or
      measuring a phase shift $\Delta\phi(\omega)$ of the electrical output signal $g(t, \omega)$ from the electrical driving signal $f(t, \omega)$, for each of the angular frequency $\omega$ swept, in order to obtain a frequency spectrum for the phase shift of the characteristic transfer function.

16. The device of claim 12, further comprising:
   a pair of amplifiers configured to amplify and convert the pair of sensor signals from a form of charge to a form of voltage before entering the adder.

* * * * *